(12) United States Patent
Schmidt et al.

(10) Patent No.: US 9,729,402 B2
(45) Date of Patent: Aug. 8, 2017

(54) NETWORK DEVICE AND CALL SIMULATION TOOL

(71) Applicant: Cellco Partnership, Basking Ridge, NJ (US)

(72) Inventors: Christopher M. Schmidt, Branchburg, NJ (US); Gopinath Venkatasubramaniam, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 805 days.

(21) Appl. No.: 14/144,897

(22) Filed: Dec. 31, 2013

(65) Prior Publication Data
US 2015/0186564 A1    Jul. 2, 2015

(51) Int. Cl.
*G06F 17/50* (2006.01)
*G06G 7/62* (2006.01)
*H04L 12/24* (2006.01)

(52) U.S. Cl.
CPC ............ *H04L 41/145* (2013.01); *H04L 41/22* (2013.01)

(58) Field of Classification Search
CPC .............................. H04L 41/145; H04L 41/22
USPC ............................................................. 703/13
See application file for complete search history.

(56) References Cited

U.S. PATENT DOCUMENTS

2001/0011215 A1\* 8/2001 Beeker ................ H04L 41/145
                                                                   703/27

\* cited by examiner

*Primary Examiner* — Saif Alhija

(57) ABSTRACT

A first network device executing a device simulation tool receives a selection of a second network device in a communications network. The first network device receives a selection of at least one use case, scenario or error condition associated with operation of the second network device or the communications network, and executes a network simulation of the communications network based on the at least one use case, scenario or error condition. The first network device generates a call flow diagram, which involves the selected second network device, based on the executed network simulation, and provides a graphical display of the generated call flow diagram.

24 Claims, 17 Drawing Sheets

NETWORK DEVICE AND CALL SIMULATION TOOL

BACKGROUND

Communication networks, such as telecommunications networks and computer networks (e.g., the Internet), involve terminal nodes, transmission links and intermediate network nodes that convey data between the terminal nodes. The terminal nodes may further connect to end-user devices, such as a cellular telephone in the case of a telecommunication network or a lap-top computer in the case of a computer network. The transmission links connect the nodes of the communication networks together such that data may be circuit switched or packet switched to pass the data from one end-user node (i.e., user device) to another via the intermediate nodes of the communication network. Each node in the communications network has a unique address such that data can be correctly routed between a sender and a recipient. Each type of communication network typically has a standard architecture, and communicates using one or more standard communication protocols. One example would be a communication network using the Long Term Evolution (LTE) Evolved Packet System (EPS) network architecture and Internet Protocol (IP).

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Figure 1:
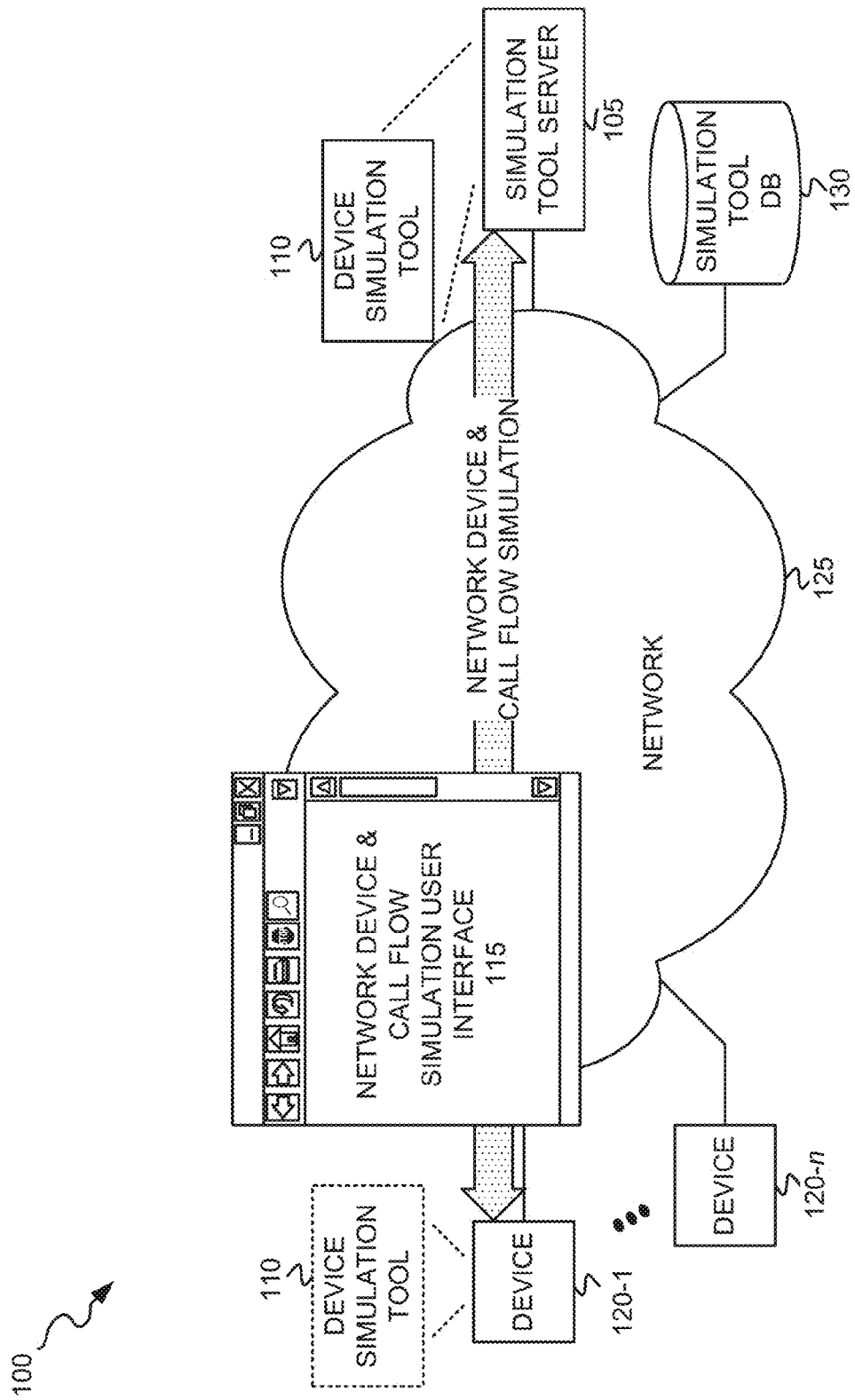
FIG. 1 illustrates an exemplary network environment in which a device simulation tool may be used to simulate interactions between selected types of network devices in a communications network and other nodes in the communications network, and to generate device-to-network simulated call flow ladder diagrams.

FIG. 1 illustrates an exemplary network environment 100 in which a device simulation tool may be used to simulate interactions between one or more user-selected network devices and other nodes in an emulated communications network, and to generate device-to-network simulated call flow ladder diagrams based on the simulated interactions. Network environment 100 may include a simulation tool server 105, devices 120-1 through 120-*n*, a network 125, and a simulation tool database (DB) 130. As shown in FIG. 1, simulation tool server 105 may implement a device simulation tool 110 that provides a network device and call flow simulation user interface 115 to one or more devices 120-1 through 120-*n* (generically and individually referred to herein as a "device 120" or collectively as "devices 120"), via network 125. User interface 115 enables users (not shown) at each device 120 to interact with device simulation tool 110 to simulate, via a user-customized simulation, one or more user-selected network devices' interaction with an emulated communications network, and/or other devices or network nodes. Device simulation tool 110 (with solid line boundary) is depicted as being executed at simulation tool server 105 on the right side of FIG. 1. Device simulation tool 110 (with dotted-line boundary) is depicted, in an alternative implementation, as being executed at device 120-1 on the left side of FIG. 1. In this alternative implementation, one or more of devices 120-1 through 120-*n* may execute device simulation tool 110. To interact with simulation tool 110, the user may employ a graphical user interface (GUI, not shown in FIG. 1).

The users may select, or create, defined scenarios, use cases and/or error conditions that device simulation tool 110 may simulate to describe the interaction between the one or more selected network devices and the network and/or other network devices or nodes. Each of the scenarios may include an action or event initiated by a user-selected network device, or by another network node in the simulated communications network. For example, in an LTE network, a scenario may include a network attach, a network detach, a service request, a handover, etc. Each of the use cases may include a set of concatenated scenarios. In other words, a use case may include a network event that involves multiple sub-events, such as multiple scenarios. For example, in an LTE network, a use case may include a device power-on event, a device self provisioning event, an initiate data connection event, a voice call, etc. The error conditions may include specific scenarios cases associated with errors in the emulated communications network. The error conditions may further include error condition scenarios concatenated together in various different permutations. For example, in a telecommunications network environment, the error conditions may include hand-overs, outages of specific network node elements, low signal strength conditions (e.g., dropped messages). The users may additionally specify configuration settings associated with the simulation. The configuration settings may be associated with operational parameters of a certain selected network device, or one or more other network nodes of the communications network other than the selected network device. For example, in an LTE network, the configuration settings may include timer values associated with an evolved Node B (eNodeB) that can be updated on the eNodeB via Radio Resource Control (RRC) signaling. As another example, in an LTE network, the configuration settings may include timer values associated with a Mobility Management Entity (MME) that can be updated on the MME via Non-Access Stratum (NAS) signaling. Upon selection, or creation, the defined scenarios, use cases, error conditions and/or configuration settings may be stored in simulation tool database (DB) 130. The user may execute a simulation of the selected network device's interaction with the emulated communications network based on the selected, or created, scenarios, use cases, error conditions.

Device 120 may include, for example, a telephone (e.g., smart phone); a laptop, desktop, palmtop or tablet computer; a personal digital assistant (PDA); a set-top box (and associated television); or any other type of digital computing device that may communicate via network 125. Device 120 may implement a web browser that may access device simulation tool 110 via user interface 115.

Simulation tool server 105 may include a network device that enables devices 120 to engage in network device and call flow simulation via user interface 115. Simulation tool server 105 may enable users at devices 120-1 through 120-n to interact with device simulation tool 110 to execute a simulation of a communications network, including a simulation of the actions/interactions of one or more selected network devices in the communications network.

Simulation tool DB 130 may include a network device that stores a data structure, such as, for example, a database. Simulation tool DB 130 may store, among other data, user-created use case files, scenario files, error condition files, and configuration setting files. Details of an example of simulation tool DB 130 are described below with respect to FIG. 3.

Network(s) 125 may include one or more networks of various types including, for example, a satellite network, a telecommunications network (e.g., a Public Switched Telephone Network (PSTN) or Public Land Mobile Network (PLMN)), a local area network (LAN), a wide area network (WAN), a metropolitan area network (MAN), an intranet, and/or the Internet.

The configuration of components of network environment 100 illustrated in FIG. 1 is for illustrative purposes. Other configurations may be implemented. Network environment 100 may include additional, fewer and/or different network components than those depicted in FIG. 1.

Figure 2:
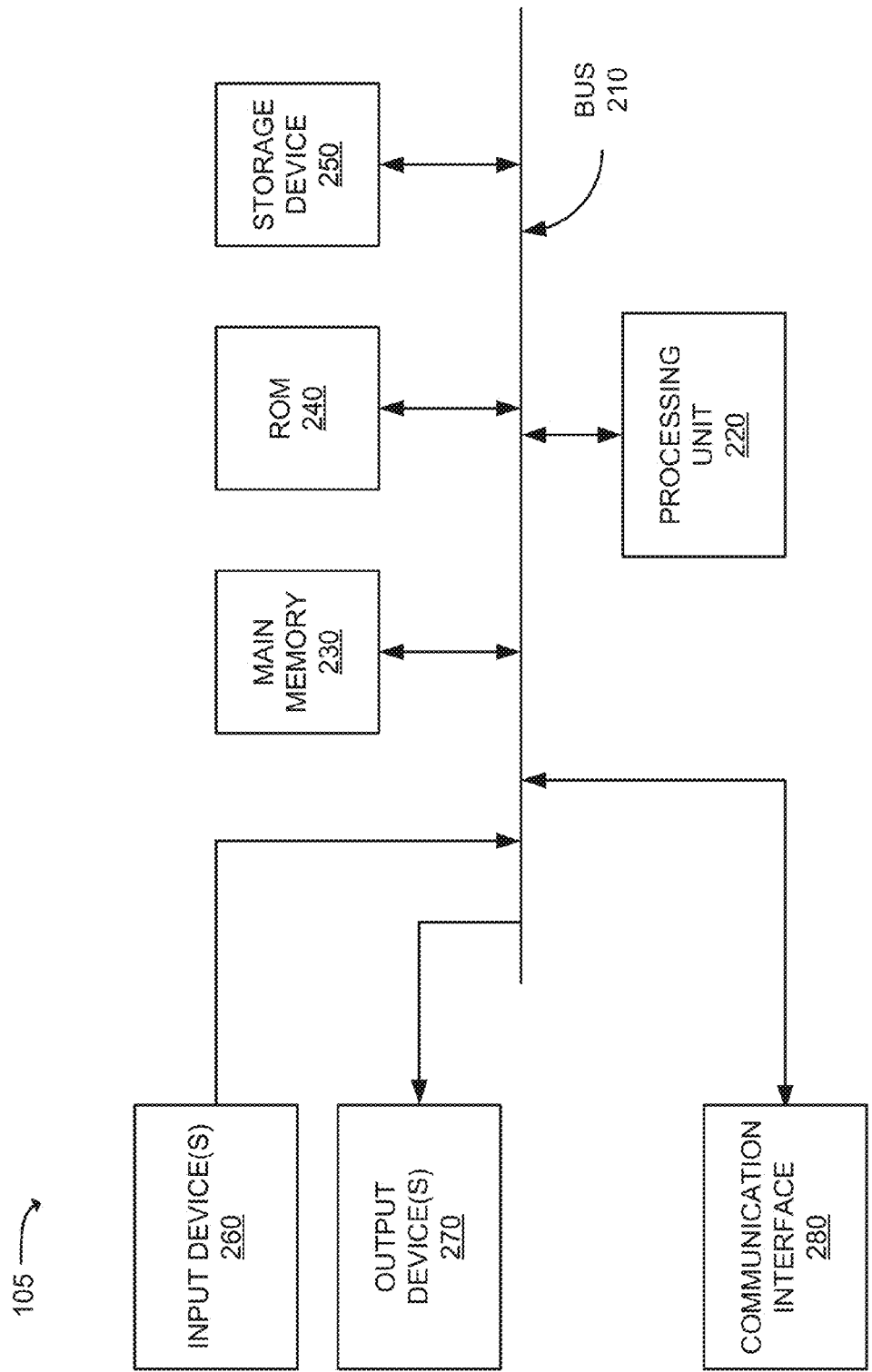
FIG. 2 is a diagram that depicts exemplary components of the simulation tool server of FIG. 1.

FIG. 2 is a diagram that depicts exemplary components of simulation tool server 105. Devices 120 and simulation tool DB 130 may be similarly configured. Simulation tool server 105 may include a bus 210, a processing unit 220, a main memory 230, a read only memory (ROM) 240, a storage device 250, an input device(s) 260, an output device(s) 270, and a communication interface(s) 280. Bus 210 may include a path that permits communication among the components of simulation tool server 105.

Processing unit 220 may include one or more processors or microprocessors, or processing logic, which may interpret and execute instructions. Main memory 230 may include a random access memory (RAM) or another type of dynamic storage device that may store information and instructions for execution by processing unit 220. ROM 240 may include a ROM device or another type of static storage device that may store static information and instructions for use by processing unit 220. Storage device 350 may include a magnetic, optical, and/or other type of data storage device (e.g., a flash drive). Main memory 230, ROM 240 and storage device 250 may each be referred to herein as a "tangible, non-transient computer-readable medium."

Input device 260 may include one or more mechanisms that permit an operator to input information to simulation tool server 105, such as, for example, a keypad or a keyboard, a display with a touch sensitive panel, voice recognition and/or biometric mechanisms, etc. Output device 270 may include one or more mechanisms that output information to the operator, including a display, a speaker, etc. Communication interface(s) 280 may include a transceiver that enables simulation tool server 105 to communicate with other devices and/or systems. For example, communication interface(s) 280 may include wired or wireless transceivers for communicating via network 125.

The configuration of components of simulation tool server 105 illustrated in FIG. 2 is for illustrative purposes. Other configurations may be implemented. Therefore, simulation tool server 105 may include additional, fewer and/or different components than those depicted in FIG. 2.

Figure 3:
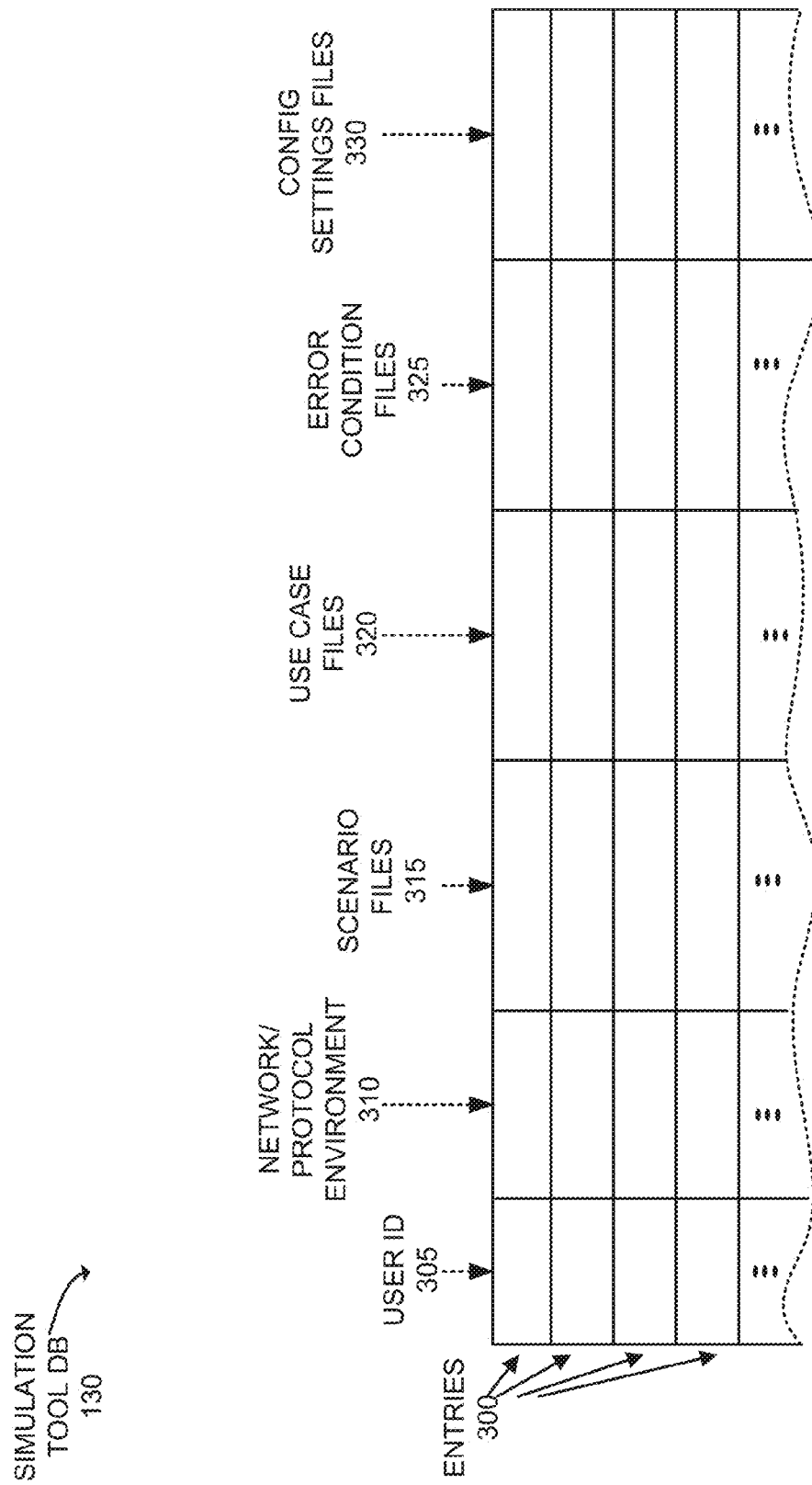
FIG. 3 is a diagram that depicts an exemplary implementation of the simulation tool database of FIG. 1.

FIG. 3 is a diagram that depicts an exemplary implementation of simulation tool DB 130. As shown, simulation tool DB 130 may include multiple entries 300, with each entry 300 including a user identifier (ID) field 305, a network/protocol environment field 310, a scenario files field 315, a use case files field 320, an error condition files field 325, and a configuration (config) settings files field 330.

User ID field 305 may store data that uniquely identifies a user, associated with a given device 120, that created the files stored in fields 315-330. Network/protocol environment field 310 may store data that identifies a communications network, and associated network protocol environment, selected by the user identified by field 305.

Scenario files field 315 may store one or more user-created files that each contains data specifying one or more scenarios associated with the network/protocol environment identified by field 310. The scenarios may specify actions or events initiated by a user-selected network device, or by another network node in the simulated communications network. Use case files field 320 may store one or more user-created files that each contains data specifying one or more use cases associated with the network/protocol environment identified by field 310. Each use case may include a set of concatenated scenarios.

Error condition files field 325 may store one or more user-created files that each contains data specifying one or more scenarios associated with errors, or potential errors, in the communications network. The data may specify error condition scenarios concatenated together in various different permutations. Config settings files field 330 may store one or more user-created files that each contains data specifying user-customized configuration parameters associated with the operation of one or more network nodes of the communications network.

The number, types, and content of the entries and/or fields in simulation tool DB 130 illustrated in FIG. 3 is for illustrative purposes. Other data structures having different numbers of, types of and/or content of, the entries and/or the fields may be implemented. Therefore, simulation tool DB 130 may include additional, fewer and/or different entries and/or fields than those depicted in FIG. 3.

Figure 4:
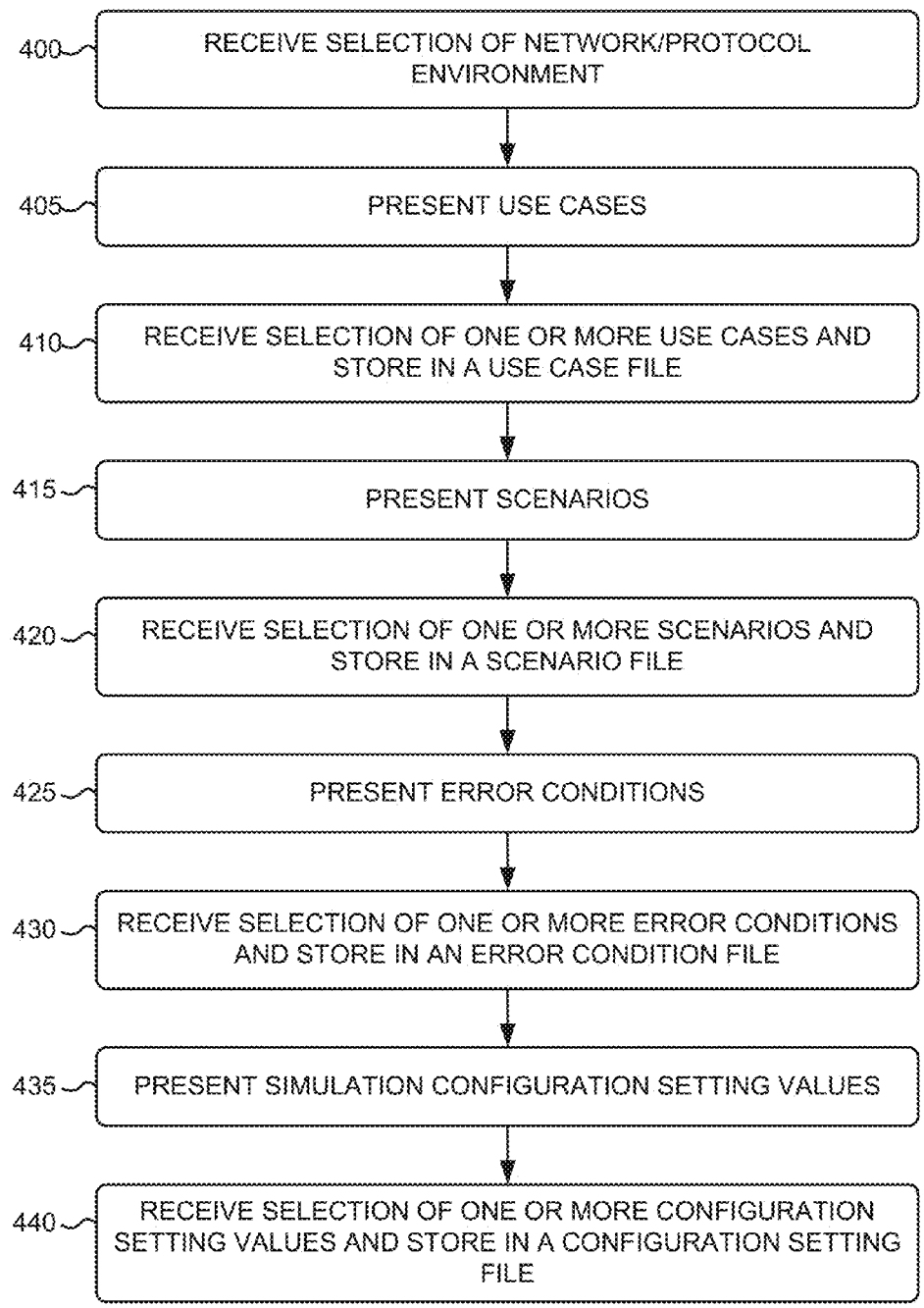
FIG. 4 is a flow diagram that depicts an exemplary process for user creation of one or more use case files, scenario files, error condition files, and/or configuration setting files and the storing thereof in the simulation tool database of FIG. 1 for future retrieval.

FIG. 4 is a flow diagram that depicts an exemplary process for user creation of one or more use case files, scenario files, error condition files, and/or configuration setting files and storing the created files in simulation tool DB 130 for future retrieval. The exemplary process of FIG. 4 may be implemented by simulation tool server 105, in conjunction with the execution of device simulation tool 110, and interaction with tool 110 by device 120 via user interface 115. The description of the exemplary process of FIG. 4 below refers to the exemplary user interfaces of FIGS. 5-8.

Figure 5:
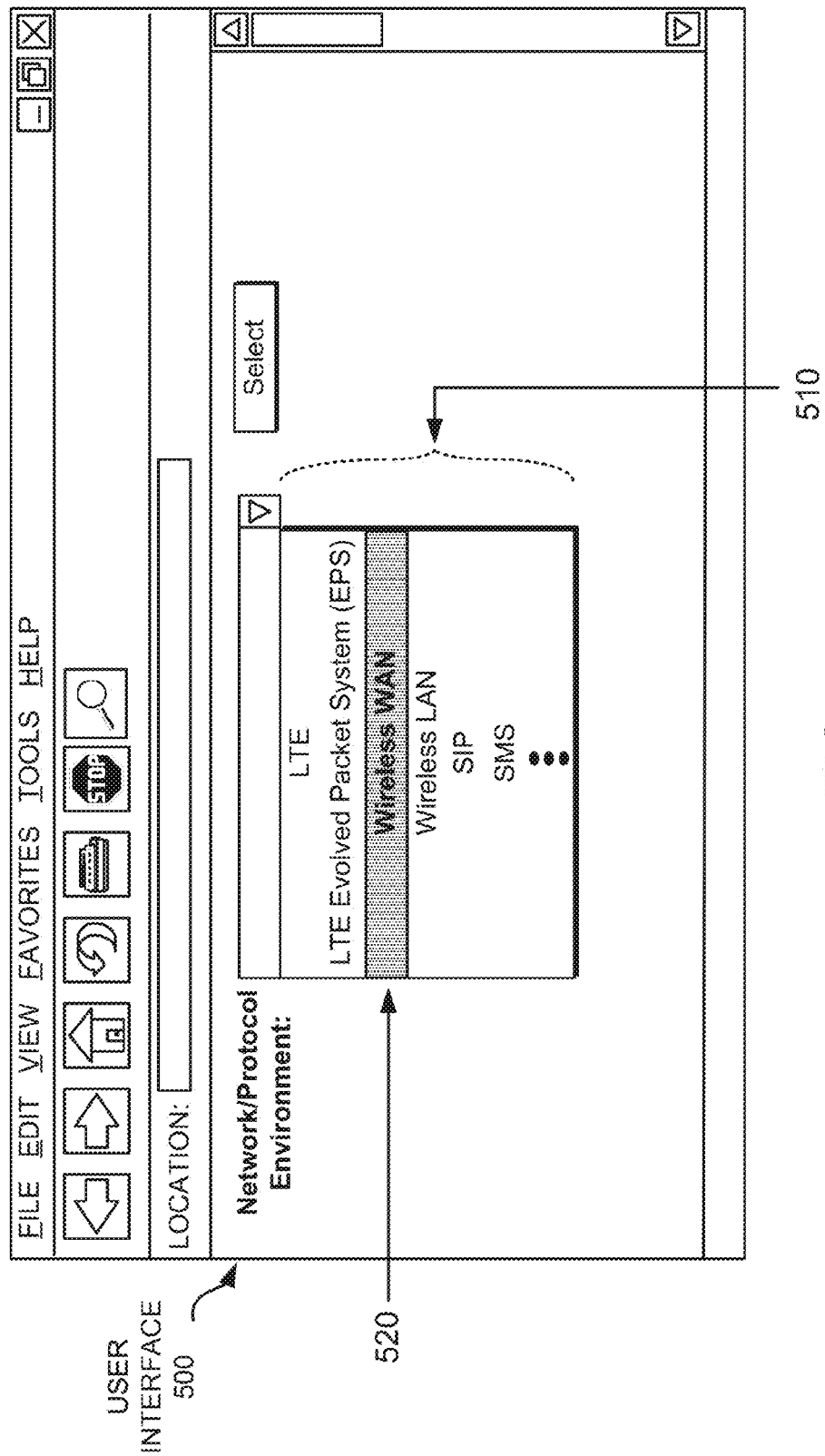
FIGS. 5-8 are diagrams that depict exemplary user interfaces associated with the exemplary process of FIG. 4.

The exemplary process may include receiving selection of a network/protocol environment for a simulation (block 400). Simulation tool server 105 may, as shown in FIG. 5, present a user interface 500 to device 120 via network 125 that includes a list 510 of different network/protocol environments that a user at device 120 may select. The user at device 120 may, for example, scroll through the list 510 of different network/protocol environments and select 520 a network/protocol environment from the list 510 for which the user may wish to create a use case file, a scenario file, an error condition file, and/or a configuration settings file. The user-selected network/protocol environment may be stored in field 310 of an entry 300 of simulation tool DB 130.

Figure 6:
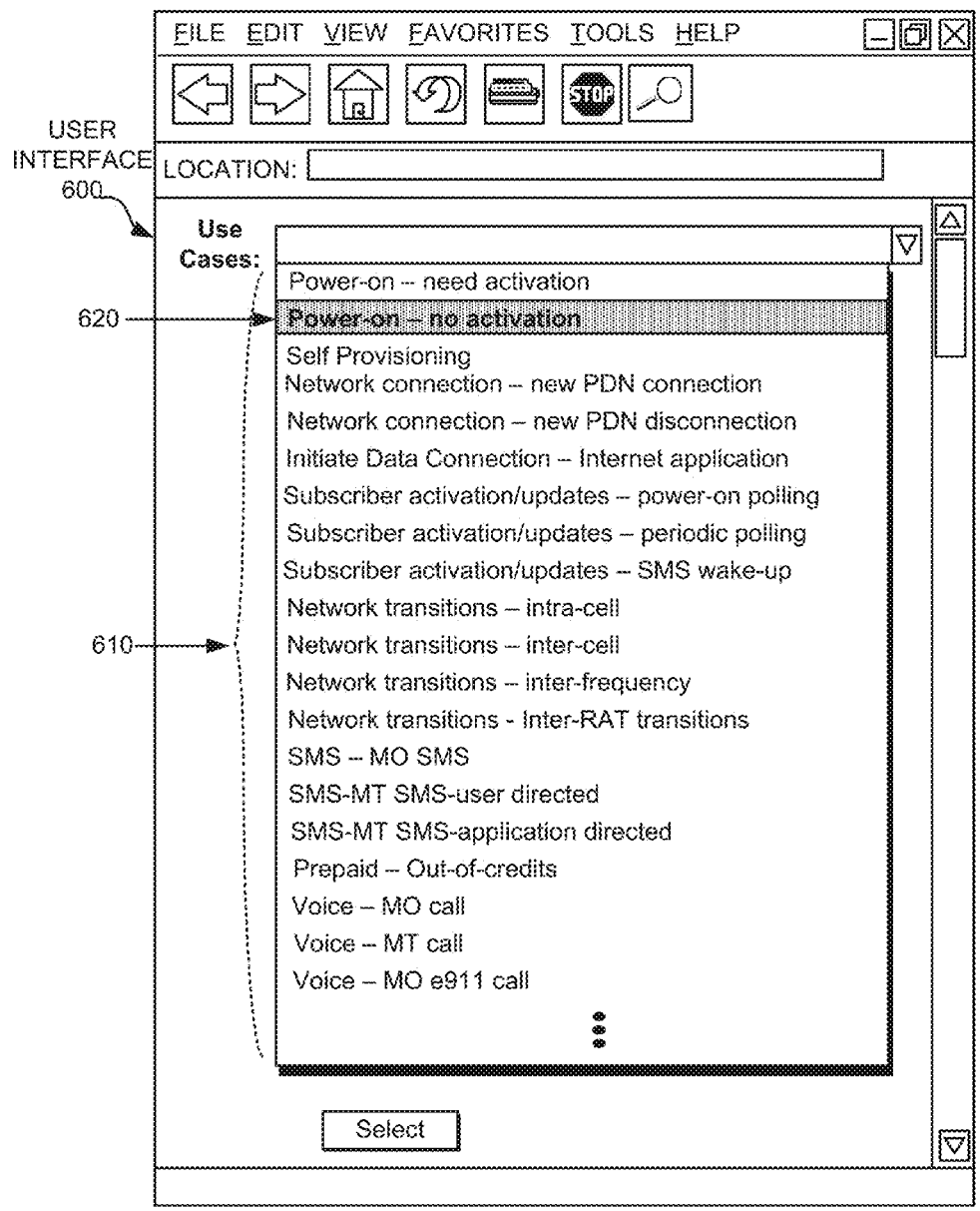

Device simulation tool 110 may present use cases (block 405) and receive a selection of one or more of the uses and store the selected use cases in a use case file (block 410). Simulation tool server 105 may, as shown in FIG. 6, present a user interface 600 to device 120 via network 125 that includes a list 610 of different use cases that a user at device 120 may select. The user at device 120 may, for example, scroll through the list 610 of different use cases and select one or more specific use cases from the list 610 for storing in a use case file. FIG. 6 depicts the selection of a single 620 use case from list 610. However, multiple different use cases may be selected from list 610 for storing in the use case file. The use cases presented by user interface 600 in list 610 may, for example, include a comprehensive list of use cases related to the specific network/protocol environment selected in block 400. The use case file may be stored in field 320 of an entry 300 of simulation tool DB 130.

Figure 7:
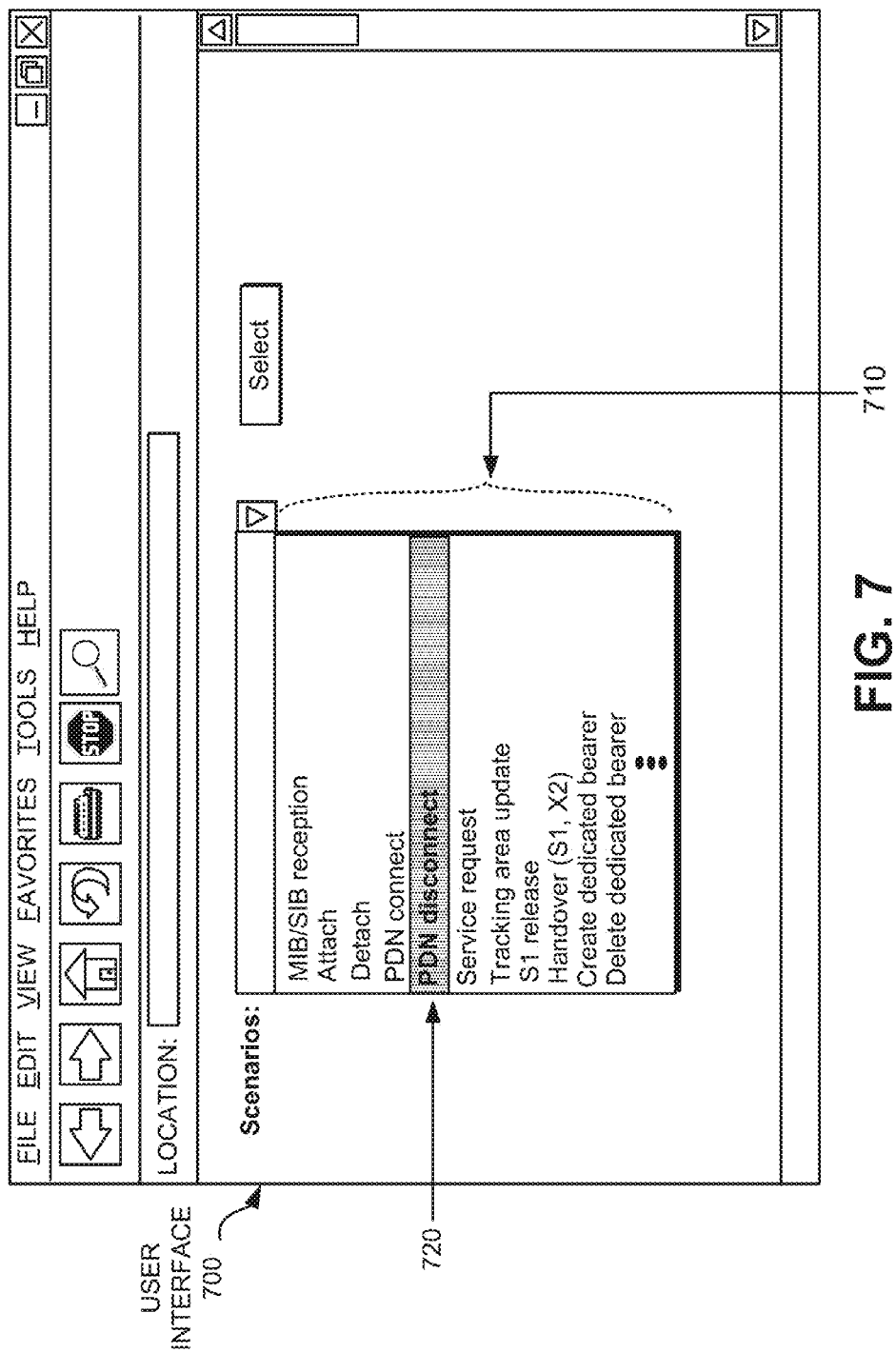

Device simulation tool 110 may present scenarios (block 415) and may receive a selection of one or more scenarios and store the selected one or more scenarios in a scenario file (block 420). Simulation tool server 105 may, as shown in FIG. 7, present a user interface 700 to device 120 via network 125 that includes a list 710 of different scenarios that a user at device 120 may select. The user at device 120 may, for example, scroll through the list 710 of different scenarios and select 720 one or more specific scenarios from the list 710 for storing in a scenario file. FIG. 7 depicts the selection of a single 720 scenario from list 710. However, multiple different scenarios may be selected from list 710 for storing in the scenario file. The scenarios presented by user interface 700 in list 710 may, for example, include a comprehensive list of scenarios related to the specific network/ protocol environment selected in block 400. The scenario file may be stored in field 315 of an entry 300 of simulation tool DB 130.

Figure 8:
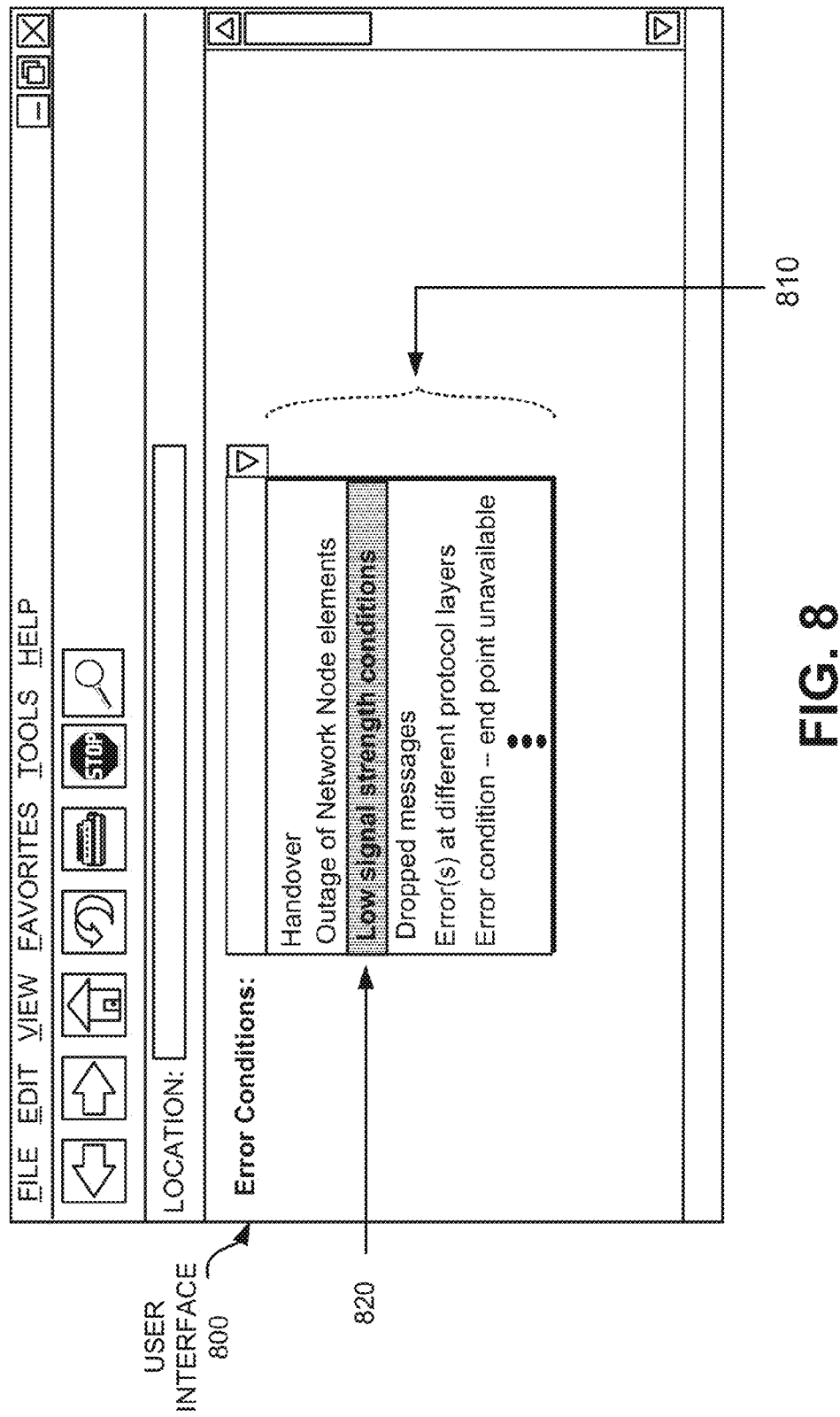

Device simulation tool 110 may present error conditions (block 425), and may receive a selection of one or more of the error conditions and store the one or more error conditions in an error condition file (block 430). Simulation tool server 105 may, as shown in FIG. 8, present a user interface 800 to device 120 via network 125 that includes a list 810 of different error conditions, or potential error causing conditions, that a user at device 120 may select. The user at device 120 may, for example, scroll through the list 810 of different error conditions and select 820 one or more specific error conditions from the list 810 for storing in the error condition file. FIG. 8 depicts the selection of a single 820 error condition from list 810. However, multiple different error conditions may be selected from list 810 for storing in the error condition file. The error conditions, or potential error causing conditions, presented by user interface 800 in list 810 may, for example, include a comprehensive list of error conditions related specifically to the network/protocol environment selected in block 400. The error condition file may be stored in field 325 of an entry 300 of simulation tool DB 130.

Device simulation tool 110 may present simulation configuration setting values (block 435), and may receive a selection of one or more of the configuration setting values and store the one or more configuration setting values in a configuration setting file (block 440). Simulation tool server 105 may present a user interface to device 120 via network 125 that includes a list of different configuration settings, and associated values that a user at device 120 may select. The user at device 120 may, for example, scroll through the list of different configuration settings, and associated values, and select one or more specific configuration settings, and its respective associated value, from the list for storing in the configuration settings file. The configuration settings, and associated values, presented by the user interface in the list may, for example, include a comprehensive list of configuration settings related specifically to the operation of network nodes in the network/protocol environment selected in block 400. The configuration settings file may be stored in field 330 of an entry 300 of simulation tool DB 130.

The exemplary process of FIG. 4 may be selectively repeated by a single user to generate multiple different use case files, scenario files, error condition files and/or configuration settings files for storing in fields 315, 320, 325 and/or 330 of an entry 300 of simulation tool DB 130. The exemplary process of FIG. 4 may also be selectively performed by multiple different users at devices 120-1 through 120-n. Therefore, at any one time, simulation tool server 105 may perform multiple parallel versions of the exemplary process of FIG. 4 such that different users at different ones of devices 120-1 through 120-n may be simultaneously creating and storing different use case files, scenario files, error condition files and/or configuration settings files.

The exemplary process of FIG. 4 has been described as being implemented by simulation tool server 105, in conjunction with the execution of device simulation tool 110 (right hand side of FIG. 1). However, in some implementations, the exemplary process of FIG. 4 may be implemented by device simulation tool 110 at device 120 (left hand side of FIG. 1), with the user-created use case files, scenario files, error condition files, and configuration settings files being sent from device 120 for storage in simulation tool DB 130.

Figure 9A:
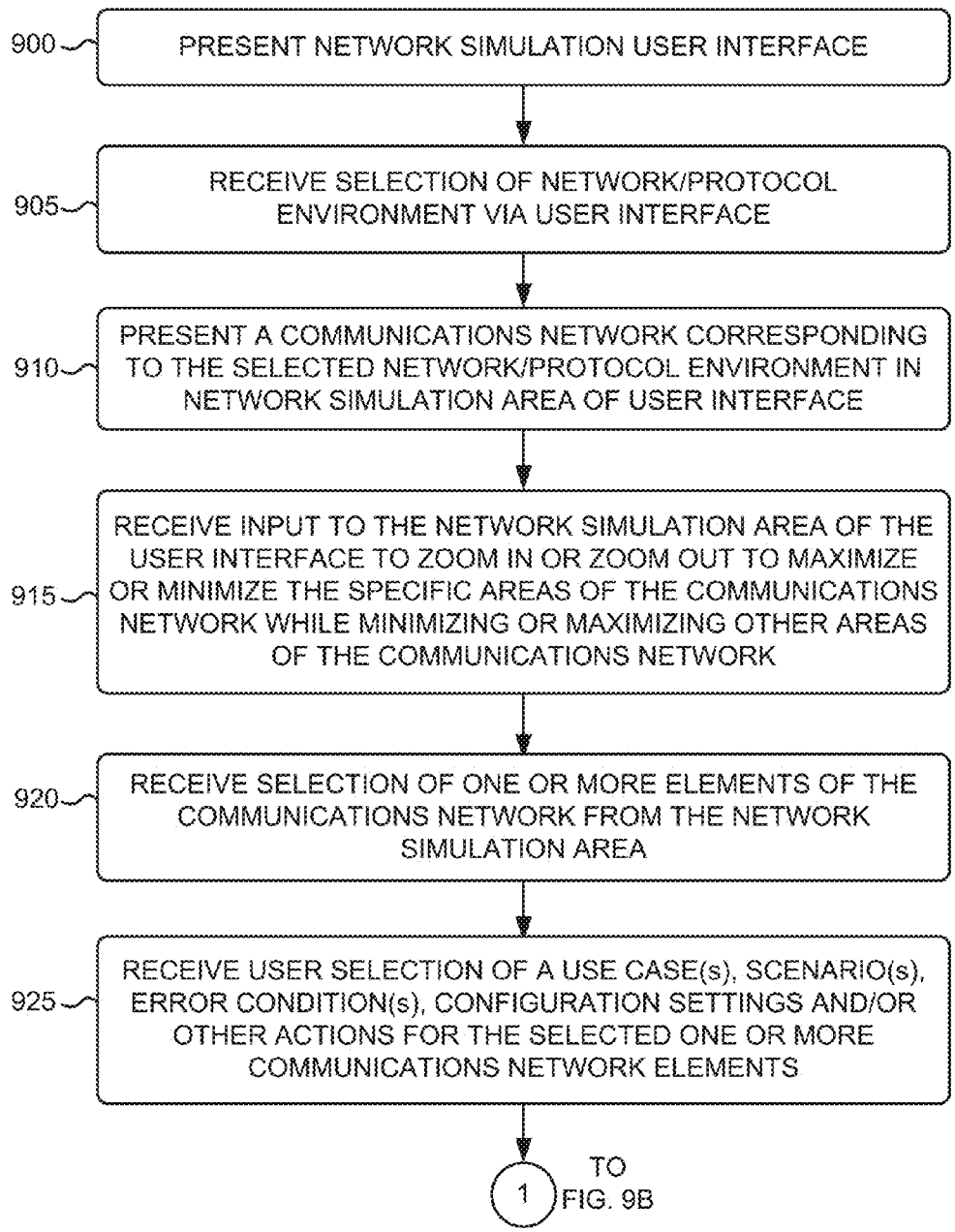
FIGS. 9A and 9B are flow diagrams that depict an exemplary process for executing a simulation of a communications network to generate a simulated call flow involving one or more user-selected elements of the communications network.
Figure 9B:
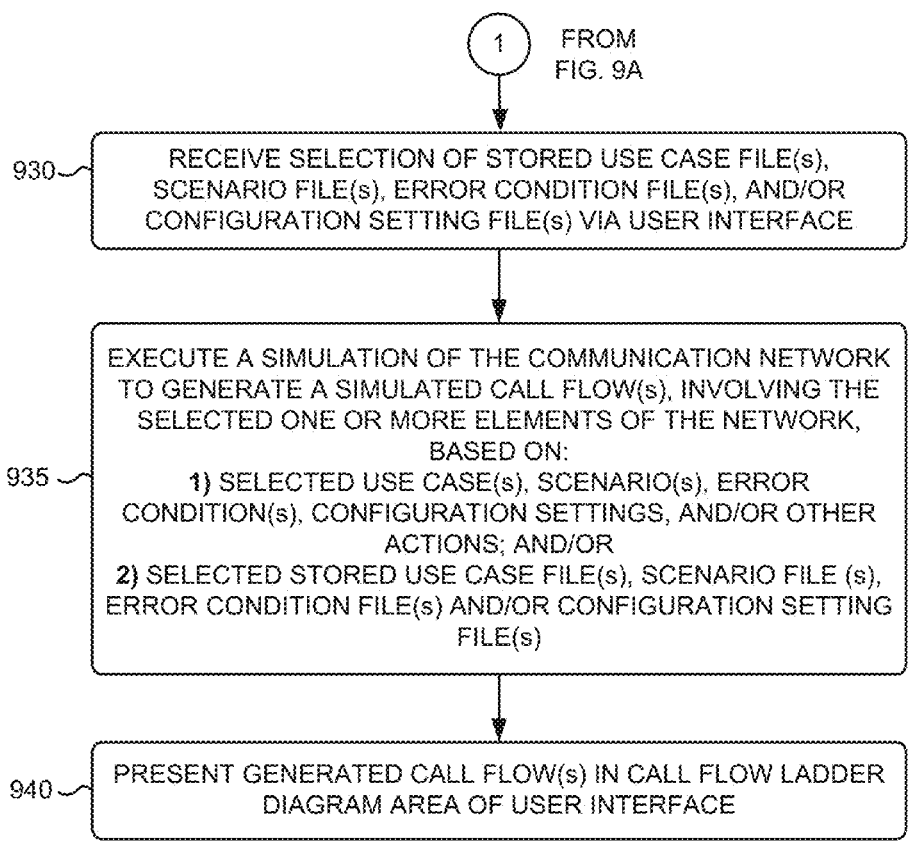

FIGS. 9A and 9B are flow diagrams that depict an exemplary process for executing a simulation of a communications network to generate a simulated call flow involving one or more user-selected elements of the communications network. The exemplary process of FIGS. 9A and 9B may be implemented by simulation tool server 105, in conjunction with the execution of device simulation tool 110, and interaction with tool 110 by device 120 via user interface 115. The description of the exemplary process of FIGS. 9A and 9B below refers to the examples of a user interface of FIGS. 10-16.

The exemplary process may include simulation tool server 105 presenting a network simulation user interface (block 900). Referring back to FIG. 1, simulation tool server 105 may send a user interface 115 to device 120-1 for display by a browser executed at device 120-1. Simulation tool server 105 may receive a selection of a network/ protocol environment via the user interface (block 905). As shown in FIG. 5, simulation tool server 105 may present user interface 500 to device 120 via network 125 that includes a list 510 of different network/protocol environments that a user at device 120 may select. The user at device 120 may scroll through the list 510 of different network/protocol environments and select 520, for example, a Wireless WAN network/protocol environment from the list 510.

Figure 10:
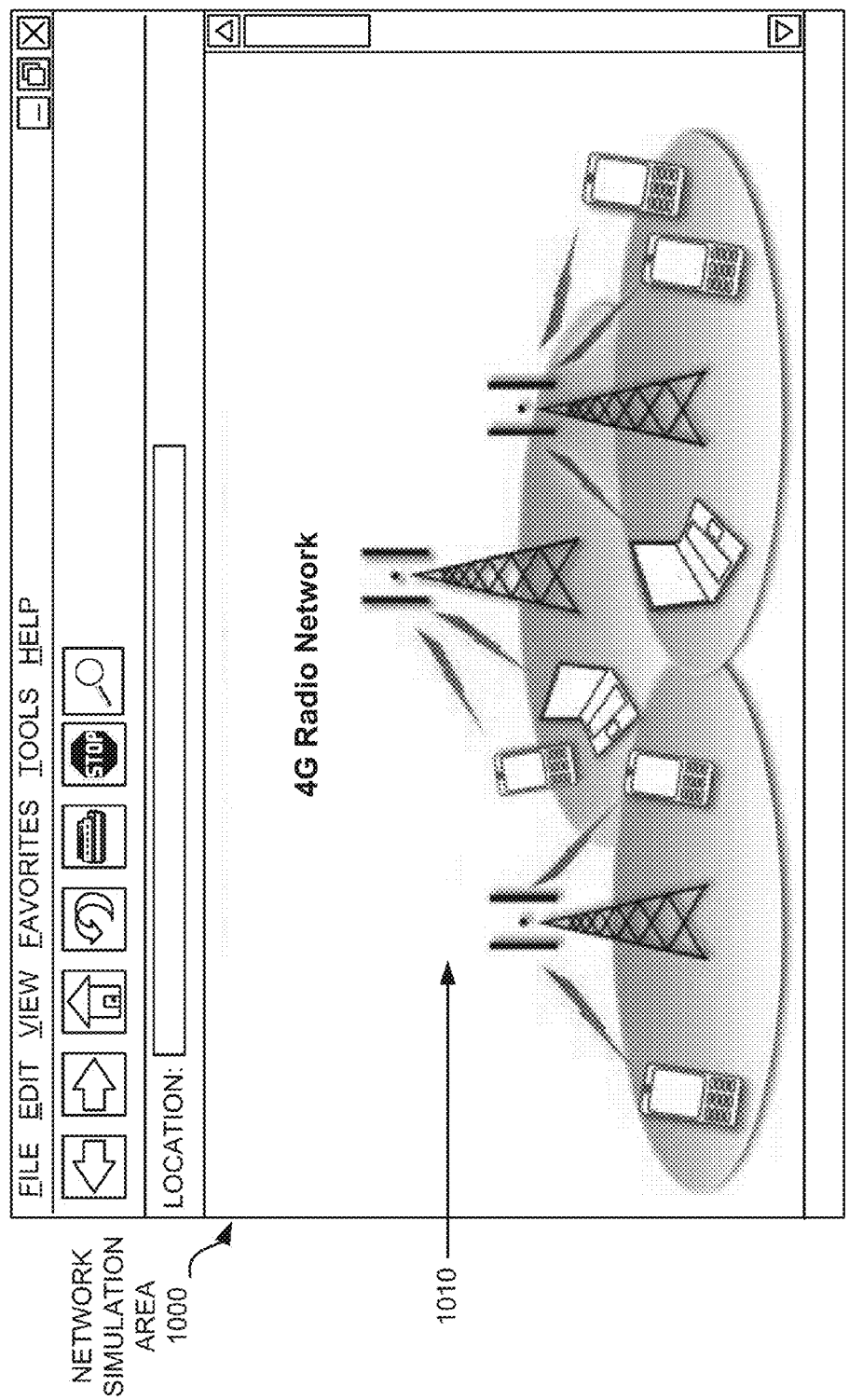
FIGS. 10-16 are diagrams that depict examples of a user interface associated with the exemplary process of FIGS. 9A and 9B.
Figure 11:
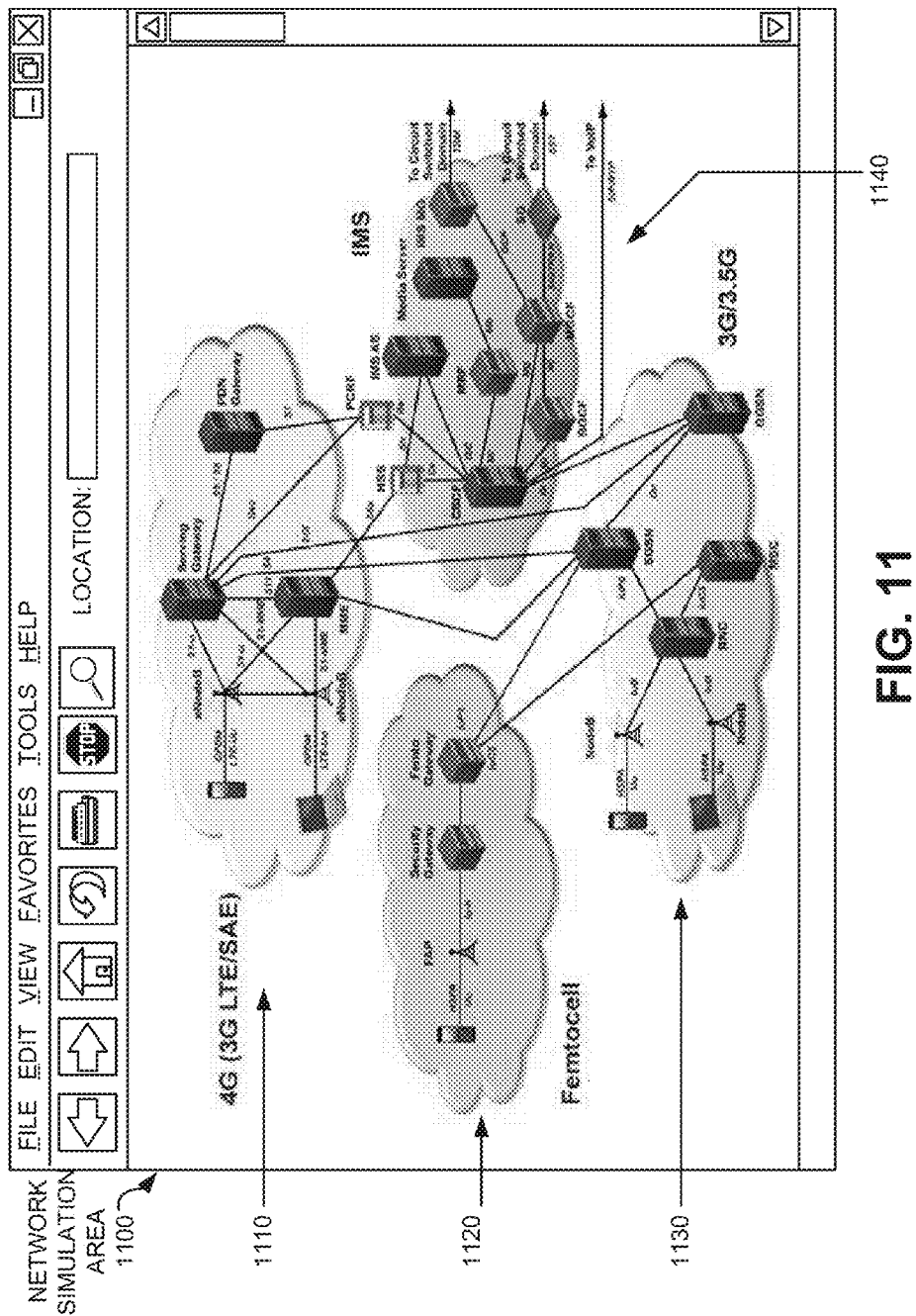
Figure 12:
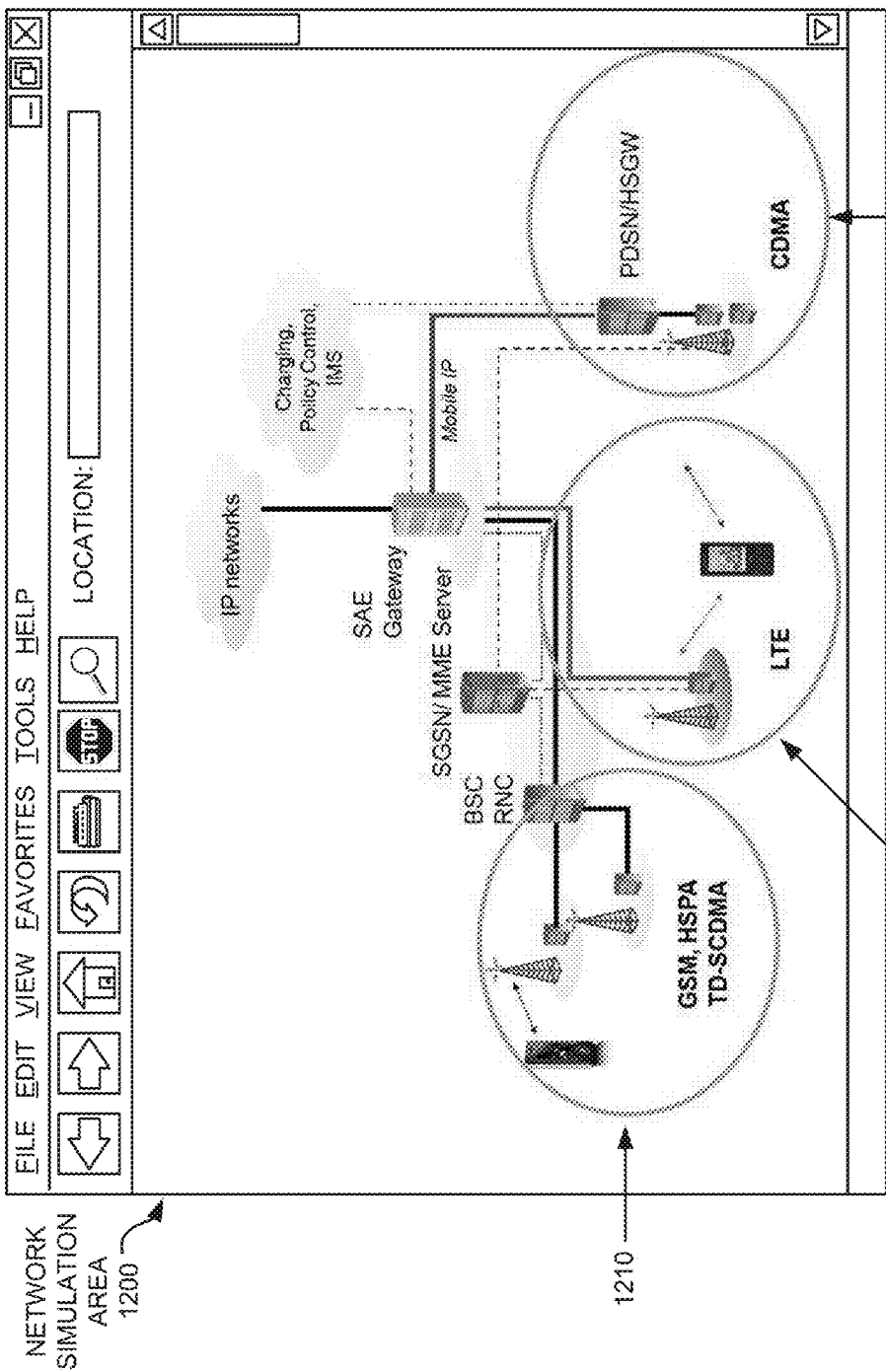

Simulation tool server 105 may present the selected communications network in a network simulation area of the user interface (block 910). FIGS. 10-13 depict examples of network simulation areas presented by simulation tool server 105 based on the selected communications network. For example, network simulation area 1000 of FIG. 10 depicts a Fourth Generation (4G) radio network/protocol environment 1010 selected by the user in block 905. FIG. 11 depicts examples of a 4G (3G LTE/SAE) communications network 1110, a femtocell network 1120, a 3G/3.5G network 1130, and/or an Internet Protocol Multimedia Subsystem (IMS) network 1140 that may be displayed by themselves, or interconnected with one another, in a network simulation area 1100 of the user interface. FIG. 12 further depicts an example network simulation area 1200 in which an Evolved Packet Core (EPC) network environment is presented, which further includes GSM network 1210 components, LTE network 1220 components, and CDMA network 1230 components.

Figure 13:
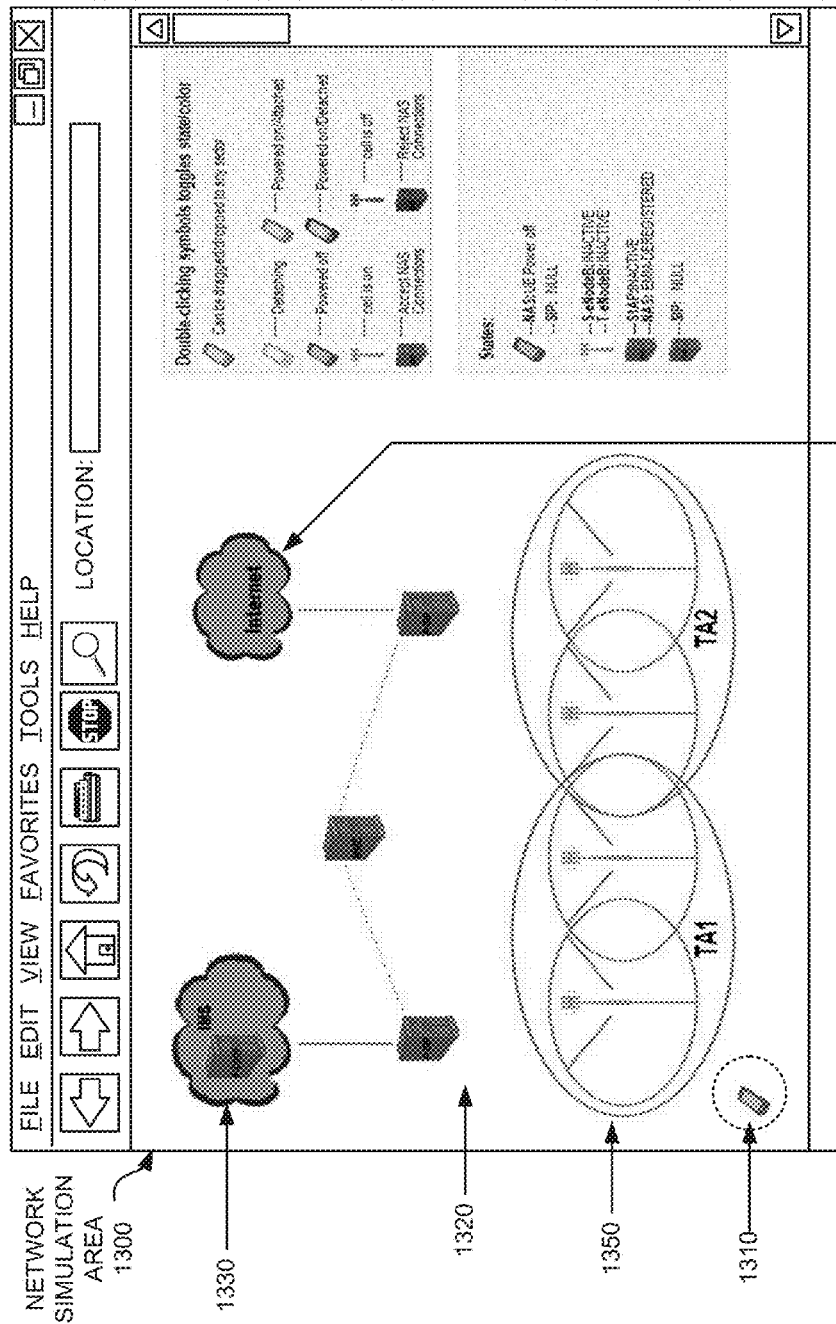

FIG. 13 depicts a further example of a network simulation area 1300 of the user interface that presents a device 1310 in the context of a selected network/protocol environment that includes device 1310 interacting with an IMS network 1330 and the Internet 1340 via a portion of the radio network 1350. Network simulation area 1300 depicted in FIG. 13 will be referenced as the example network simulation area for the remainder of the description of the exemplary process of FIGS. 9A and 9B.

Simulation tool server 105 may receive input to the network simulation area of the user interface to zoom in or zoom out to maximize or minimize specific areas of the communications network while minimizing or maximizing other areas of the communication network (block 915). Referring to network simulation area 1300 of FIG. 13, a user at device 120 may apply input (e.g., via mouse positioning and left or right clicking) to network simulation area 1300 of the user interface to select device 1310, IMS network 1330, Internet 1340, or radio network 1350 to zoom in to maximize a portion of the network, or network element. Zooming in on device 1310 may enable the user to distinguish characteristics of device 1310, such as, for example, its operational state, a model of device 1310, a software version of device 1310, etc.

Simulation tool server 105 may receive a selection of one or more elements of the communication network from the network simulation area (block 920). The user at device 120 may further select an element of network 1320 and drag and drop the element at another location in network 1320. For example, the user at device 120 may select device 1310 and move it to another location in radio network 1350. The user at device 120 may further select an element of network 1350 to change its operational state. For example, selecting device 1310 may enable the user to further select a "detached," "powered on/attached," "powered off," or "powered on/detached" operational state for device 1310.

Figure 14:
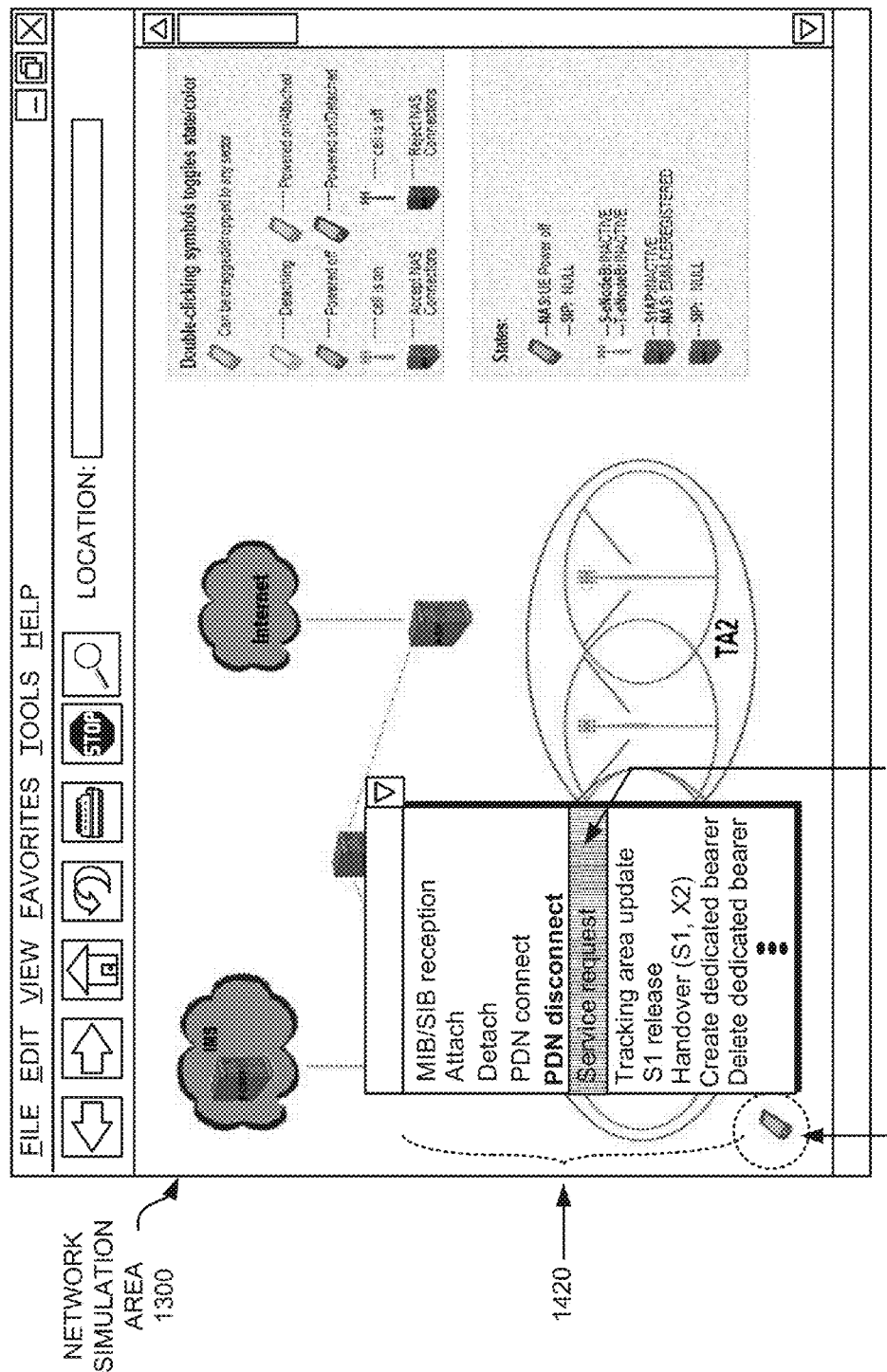

Simulation tool server 105 may receive a selection of a use case(s), a scenario(s), an error condition(s), a configuration setting(s), and/or another action(s) for the selected one or more communication network elements (block 925). For example, referring to the example network simulation area 1300, as depicted in FIG. 14, the user at device 120 may select device 1310 to further access menus of use cases, scenarios, error conditions, configuration settings, or other actions for device 1310. In the example of FIG. 14, the user at device 120 accesses a scenario menu that includes a list of scenarios 1420 that are relevant to device 1320. The user at device 120 may select (e.g., "right click" 1430) within the scenario menu of select one or more scenarios from list 1420.

Figure 15:
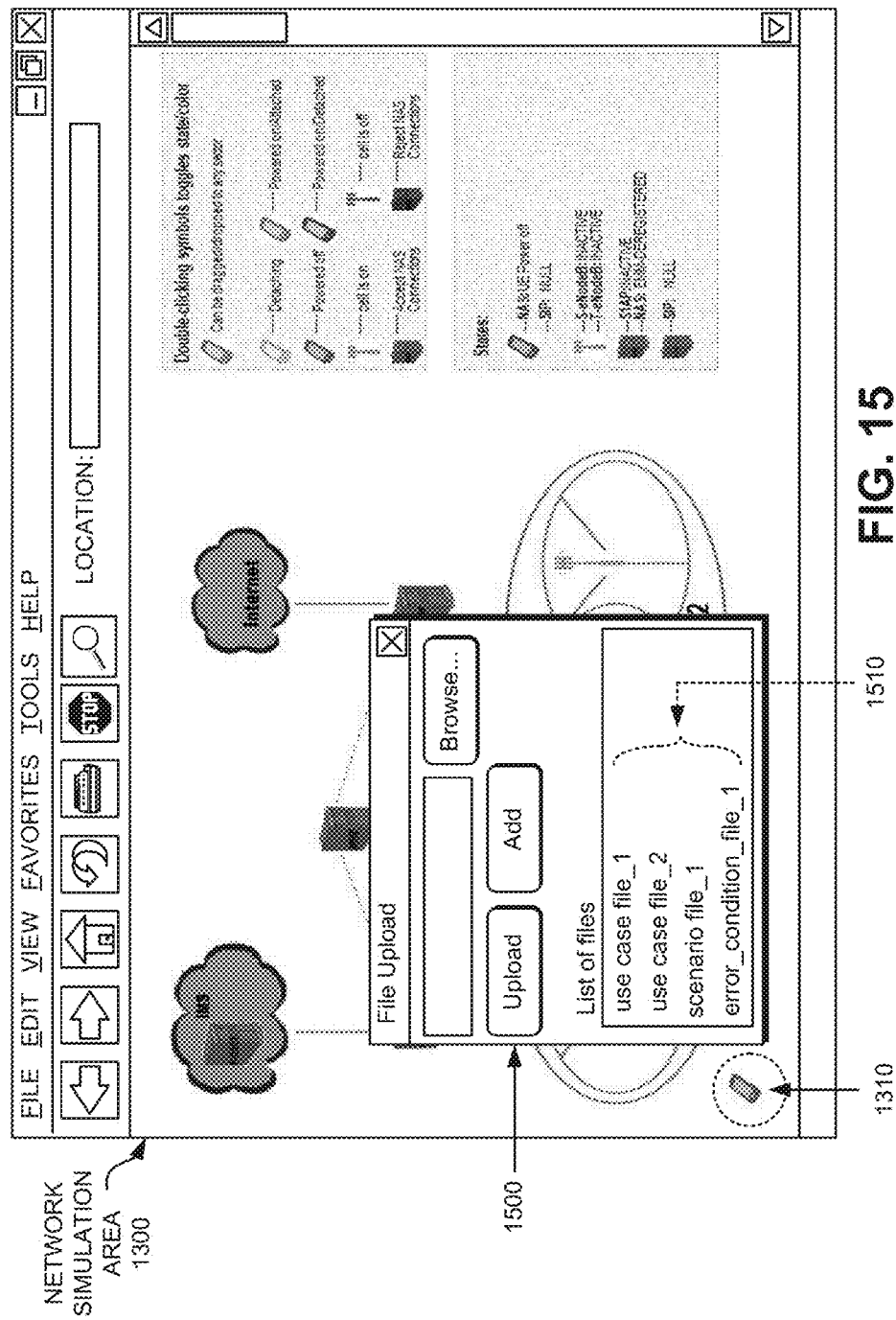

Simulation tool server 105 may receive a selection of a stored use case file(s), a scenario file(s), an error condition file(s), and/or a configuration setting file(s) (block 930). For example, referring to the example network simulation area 1300, as depicted in FIG. 15, the user at device 120 may select device 1310 to further access a dialogue box 1500 that enables the selection of one or more pre-stored use case files, scenario files, error condition files, or configuration settings files. In the example of FIG. 15, the user at device 120 accesses dialog box 1500 that presents a list 1510 of use case files, scenario files, error condition files, or configuration settings files whose contents may be used for simulating the interaction of device 1310 with network 1320. The user at device 120 may select (e.g., right click") within the list of files in dialog box 1500 to select one or more files from list 1510. The files in list 1510 may be retrieved from fields 315-330 of an entry 300 of simulation tool DB 130 having data in user ID field 305 that matches the user and a network in field 310 that was selected by the user in block 905.

Figure 16:
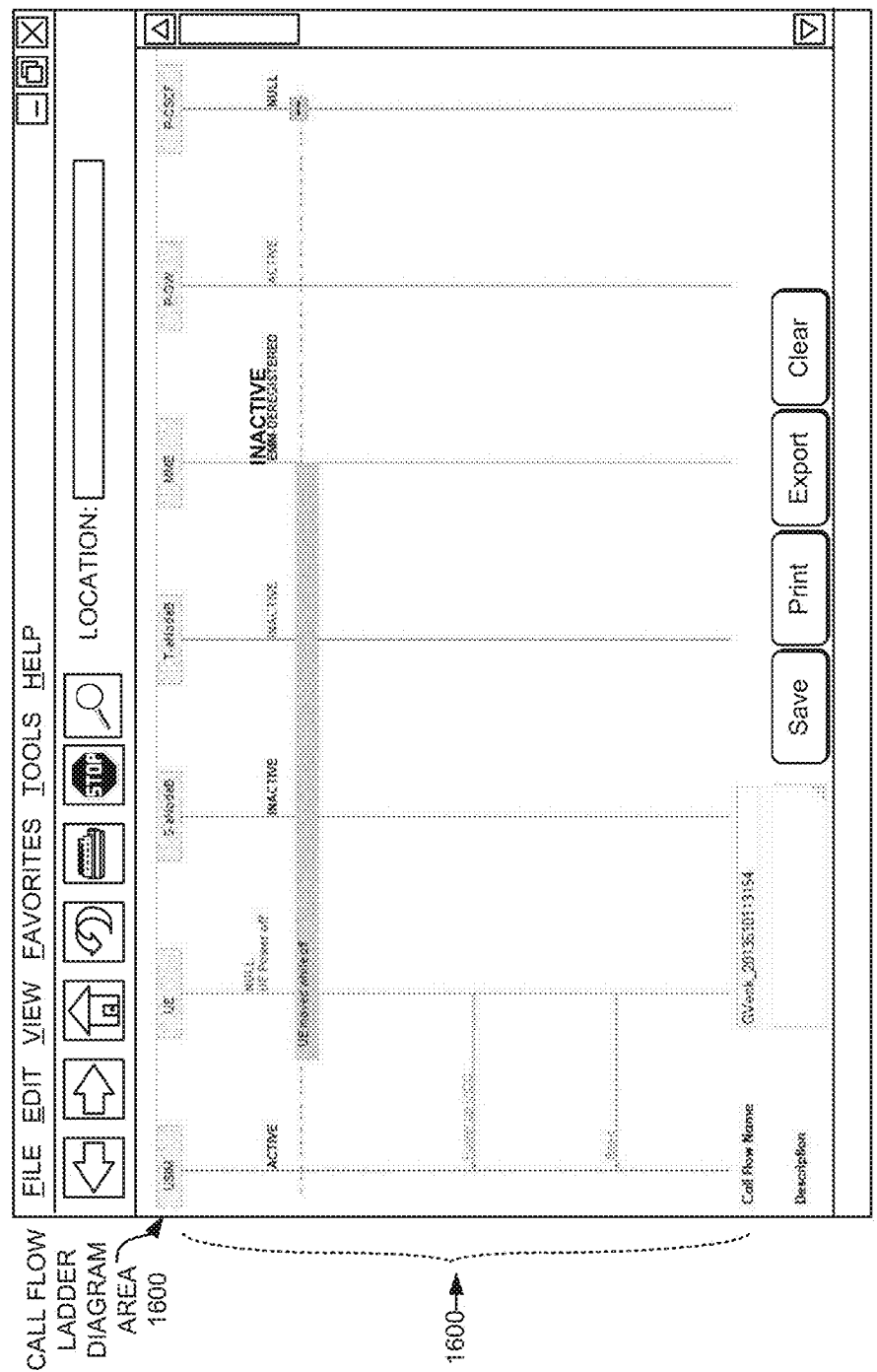

Simulation tool server 105 may generate a simulated call flow(s) for the selected one or more elements of the communication network based on the manually selected use case(s), scenario(s), error condition(s), configuration settings and/or other actions (from block 925), or based on the selected stored use case file(s), scenario file(s), error condition file(s) and/or configuration setting file(s) (from block 930) (block 935). Simulation tool server 105 uses, for example, an expert system that has knowledge of details of the selected network, and of the network protocol being used, and generates a call flow sequence based on the selected use case(s), scenario(s), error condition(s), configuration settings and/or other actions for the selected one or more communications network elements, and/or based on the selected stored use case file(s), scenario file(s), error condition file(s), and/or configuration setting file(s). Simulation tool server 105 may present the generated call flow(s) in the call flow ladder diagram area of the user interface (block 940). FIG. 16 depicts an example call flow ladder diagram area 1600 of the user interface that presents the simulated call flow for the selected device (e.g., device 1310). In the specific simulated example depicted in call flow ladder diagram area 1600, device 1310 ("UE") has moved while device 1310 was turned off, and then device 1310 was turned on. Using its expert system, simulation tool server 105 may simulate a call flow sequence of various different types of networks and network protocols based on numerous different use cases, scenarios, error conditions, configuration settings or other network/device actions.

The call flow ladder diagram of the user interface may display multiple protocol layers in a same diagram. For example, SIP call flows and LTE control plane layer 3 call flows may be displayed in a same call flow ladder diagram, with the lower level call flow collapsed and summarized in a summary. If the user chooses to, the user may expand the lower level call flow summary and the overall call flow display adapts accordingly with the diagram's focus being on the lower level expanded messages and the higher level messages just before and just after the lower level messages. The lower level call flows may be collapsed by collapsing individual connection scenarios, or by different layers (e.g., RRC). For each use case depicted in the call flow ladder diagram, the user may be able to collapse or expand the call flow to or from a summary. The user may be able to select (e.g., click on, hover over) a specific message in the call flow ladder diagram area and the message information elements or fields of the selected message may be made visible. From the call flow ladder diagram area, the user may be able to print the simulated call flow in hard copy, or export it to the format of another application (e.g., Visio). The user may be able to display, print or export either direct device-to-network call flows, or call flows including intermediate messages between network elements. The call flow ladder diagram area may provide, for example, a hyperlink to the standards and/or requirements document associated with the specific user-selected message (i.e., directing the user to the specific section or page in the standards/requirements that addresses the message). At the top of the call flow ladder diagram area between the network elements and the actual call flows, the established logical bindings between network elements may be displayed. For example, signaling radio bearers (SRBs) for UE-eNodeB interfaces may displayed at the top of the call flow ladder diagram. As another example, for an LTE network, the established data radio bearers (DRBs) may be displayed and grouped per Packet Data Network (PDN) connection, and the Quality Class Identifier (QCI) may also be displayed.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 4, 9A and 9B, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
 providing, via a user interface, a graphical representation of a communications network;
 receiving, at a first network device executing a device simulation tool, a selection of a second network device in the communications network selected via the user interface;
 providing, via the user interface, a user-selectable first list of a plurality of use cases, a user-selectable second list of a plurality of scenarios, and a user-selectable third list of a plurality of error conditions associated with operation of the second network device or the communications network;
 receiving, at the first network device, a selection of at least one use case, scenario or error condition associated with operation of the second network device or the communications network selected from the user-selectable first, second or third lists, wherein receiving the selection of at least one use case, scenario or error condition, further comprises:
  receiving, via interaction with the user interface, the selection of the at least one case from the first list of the plurality of use cases, the at least one scenario from the second list of the plurality of scenarios, or the at least one error condition from the third list of the plurality of error conditions;
 executing a network simulation of the communications network based on the selected at least one use case, scenario or error condition;
 generating a call flow diagram, that involves the selected second network device, based on the executed network simulation; and
 providing a graphical display of the generated call flow diagram.

2. The method of claim 1, wherein the at least one scenario comprises an action or event initiated by the selected second network device, or by another network node in the communications network.

3. The method of claim 2, wherein the at least one use case comprises multiple concatenated scenarios.

4. The method of claim 1, wherein the at least one error condition comprises an error, or potential error, associated with the operation of the communications network.

5. The method of claim 1, further comprising:
 providing, from the first network device to a third network device, the graphical representation of the communications network via the user interface,
 wherein receiving the selection of the second network device in the communications network comprises:
 receiving, via interaction of a user at the third network device with the graphical representation of the communications network, the selection of the second network device.

6. The method of claim 1, wherein receiving the selection of at least one use case, scenario or error condition, further comprises:
 receiving, via interaction of a user with the user interface, selection of a previously stored use case file, scenario file, or error condition file,
 wherein the use case file includes data specifying one or more use cases, wherein the scenario file includes data specifying one or more scenarios, and wherein the error condition file includes data specifying one or more error conditions.

7. The method of claim 1, further comprising:
 receiving, at the first network device, a selection of one or more configuration settings associated with operational parameters of the second network device, or one or more network nodes in the communications network.

8. A tangible non-transient computer-readable medium containing instructions executable by at least one processor, the computer-readable medium comprising:
 one or more instructions for providing, via a user interface, a graphical representation of a communications network;
 one or more instructions for receiving, via the user interface, a selection of a network device in the communications network;
 one or more instructions for providing, via the user interface, a user-selectable first list of a plurality of use cases, a user-selectable second list of a plurality of scenarios, and a user-selectable third list of a plurality of error conditions associated with operation of the network device or the communications network;
 one or more instructions for receiving a selection of at least one use case, scenario or error condition associated with operation of the network device or the communications network selected from the user-selectable first, second or third lists, wherein receiving the selection of at least one use case, scenario or error condition, further comprises:
receiving, via interaction with the user interface, the selection of the at least one case from the first list of the plurality of use cases, the at least one scenario from the second list of the plurality of scenarios, or the at least one error condition from the third list of the plurality of error conditions;
one or more instructions for executing a simulation of the communications network based on the selected at least one use case, scenario or error condition;
one or more instructions for generating a call flow diagram, that involves the selected network device, based on the executed network simulation; and
one or more instructions for providing a graphical display of the generated call flow diagram.

9. The computer-readable medium of claim 8, wherein the at least one scenario comprises an action initiated by the selected network device, or another network node in the communications network.

10. The computer-readable medium of claim 9, wherein the at least one use case comprises multiple concatenated scenarios.

11. The computer-readable medium of claim 8, wherein at least one error condition comprises an error, or potential error, associated with the operation of the communications network.

12. The computer-readable medium of claim 8, further comprising:
one or more instructions for providing, to a second network device, the graphical representation of the communications network,
wherein the one or more instructions for receiving the selection of the network device in the communications network further comprise:
one or more instructions for receiving, via interaction of a user with the graphical representation of the communications network, the selection of the network device.

13. The computer-readable medium of claim 8, wherein the one or more instructions for receiving the selection of at the least one use case, scenario or error condition, further comprises:
one or more instructions for receiving, via interaction of a user with the user interface, selection of a previously stored use case file, scenario file, or error condition file,
wherein the use case file includes data specifying one or more use cases, wherein the scenario file includes data specifying one or more scenarios, and wherein the error condition file includes data specifying one or more error conditions.

14. The computer-readable medium of claim 8, further comprising:
one or more instructions for receiving a selection of one or more configuration settings associated with operational parameters of the selected network device or one or more network nodes in the communications network.

15. A device, comprising:
a display device;
a processing unit configured to execute a graphical user interface and present the graphical user interface via the display device, and to:
provide, via the graphical user interface, a graphical representation of a communications network,
receive, via the graphical user interface, user selection of a network device in the communications network selected via the user interface,
provide, via the user interface, a user-selectable first list of a plurality of use cases, a user-selectable second list of a plurality of scenarios, and a user-selectable third list of a plurality of error conditions associated with operation of the network device or the communications network,
receive, via the graphical user interface, user selection of at least one use case, scenario or error condition associated with simulated operation of the network device or the communications network selected from the user-selectable first, second or third lists, wherein, when receiving the selection of the at least one use case, scenario or error condition, the processing unit is further configured to:
receive, via interaction with the user interface, the selection of the at least one case from the first list of the plurality of use cases, the at least one scenario from the second list of the plurality of scenarios, or the at least one error condition from the third list of the plurality of error conditions,
execute a network simulation of the communications network based on the selected at least one use case, scenario or error condition,
generate a call flow diagram, that involves the selected network device, based on the executed network simulation, and
display the generated call flow diagram, via the display device, using the graphical user interface.

16. The device of claim 15, wherein the at least one scenario comprises an action initiated by the selected network device, or another network node in the communications network.

17. The device of claim 16, wherein the at least one use case comprises multiple concatenated scenarios.

18. The device of claim 15, wherein the at least one error condition comprises an error, or potential error, associated with the operation of the communications network.

19. The device of claim 15, wherein, when receiving the selection of the at least one use case, scenario or error condition, the processing unit is further configured to:
receive, via interaction of a user with the graphical user interface, selection of a previously stored use case file, scenario file, or error condition file,
wherein the use case file includes data specifying one or more use cases, wherein the scenario file includes data specifying one or more scenarios, and wherein the error condition file includes data specifying one or more error conditions.

20. The device of claim 15, wherein the processing unit is further configured to:
receive a selection of one or more configuration settings associated with operational parameters of the selected network device or one or more network nodes in the communications network.

21. The method of claim 1, wherein the call flow diagram comprises a call flow ladder diagram that depicts an interaction between the selected second network device and one or more other nodes of the communications network.

22. The computer-readable medium of claim 8, wherein the call flow diagram comprises a call flow ladder diagram that depicts an interaction between the selected network device and one or more other nodes of the communications network.

23. The device of claim 15, wherein the call flow diagram comprises a call flow ladder diagram that depicts an interaction between the selected network device and one or more other nodes of the communications network.

24. The device of claim 15, wherein the processing unit is further configured to:
- receive a selection of one or more configuration settings associated with operational parameters of the selected network device or one or more network nodes in the communications network,
- wherein, when executing the network simulation of the communications network, the processing unit is further configured to:
- execute the network simulation based further on the selected one or more configuration settings.

\* \* \* \* \*